D. E. EATON, Dec'd.

M. A. EATON, Administratrix, G. B. DENNIS, Assignee.

Stamp-Canceler.

No. 8,282. Reissued June 11, 1878.

Witnesses;
Chas. M. Rock
Geo. W. Berry

Inventor;
Graham B. Dennis
assignee of Maria A. Eaton
admrx. of Daniel E. Eaton,
deceased,
by his Attys.
Rock & Ritchie

UNITED STATES PATENT OFFICE.

GRAHAM B. DENNIS, OF DAYTON, OHIO, ASSIGNEE OF MARIA A. EATON, ADMINISTRATRIX OF DANIEL E. EATON, DECEASED.

IMPROVEMENT IN STAMP-CANCELERS.

Specification forming part of Letters Patent No. 121,765, dated December 12, 1871; Reissue No. 8,282, dated June 11, 1878; application filed May 27, 1878.

*To all whom it may concern:*

Be it known that DANIEL E. EATON, of Boston, in the county of Suffolk and State of Massachusetts, invented a Device for Canceling Postage or other Stamps; and that the following specification is a full, clear, and exact description of the invention, sufficient to enable those skilled in the art to practice it.

The invention relates to a new device for canceling postage or other stamps by branding or burning them.

The novelty of the invention consists in the application of electricity to a properly-constructed die or stamp, whereby the die, which may be a coil of platinum wire, is heated sufficiently to char or burn the surface of the postage-stamp, and thereby cancel it so effectually as to prevent its reuse. For this purpose, the stamp or canceler handle is made with an insulated or non-conducting button, having a stem or spindle extending into an insulated handle, or a handle made of non-conducting material, the handle containing a spring for forcing the button outward.

Across the face of the button extends a wire, the ends of which connect with metallic conductors extending through the button.

Through the handle extend two wires for connection with the two poles of a battery, these wires passing through to the bottom of the handle, so that connection is made between them by their connection with the two conductors when the handle and button are brought together, and the connection of the two conductors by the wire running across the face of the button. When the connection is thus made, the wire is heated by the electric current, and by contact with a stamp will burn a mark across its face.

Figure 2:
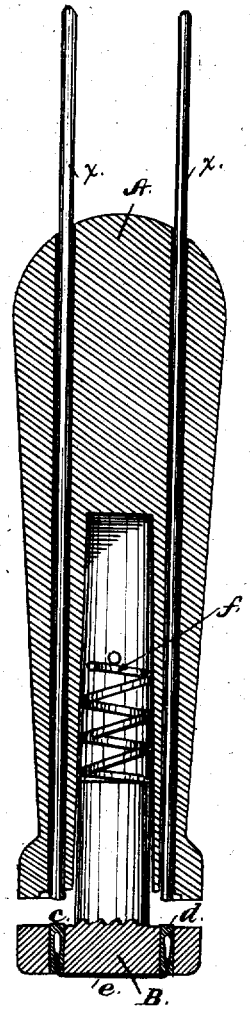
Figure 1:
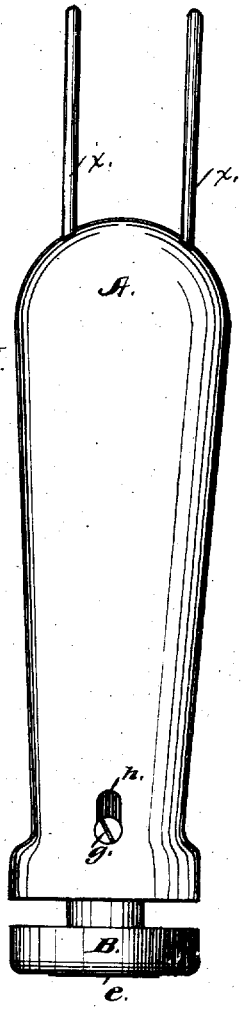
Figure 3:
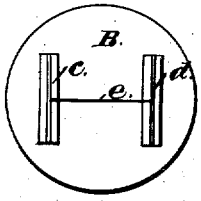

In the accompanying drawing, Figure 1 is a side elevation of a stamp-canceler embodying the invention. Fig. 2 is a central sectional view in elevation of the same. Fig. 3 is a bottom-plan view of the canceler.

A denotes the handle, made of ebony or other hard wood, or of glass or other suitable electric non-conductor.

B is the button or head, which may be made of glass or ivory, or other suitable material.

Through the button two metal plates or conductors, *c d*, extend, and connecting these plates is a wire, *e*, preferably of platinum, although other metals might answer.

Through the handle pass two wires, *x*, connecting or to be connected with the two wires or poles of an electric battery, the lower ends extending through the bottom of the handle into position to connect with the conductors *c d* when the button and handle are brought into contact.

The button is kept out by a spring, *f*, being arrested by a pin, *g*, projecting into a slot, *h*, or in any other convenient manner; and when the handle and button are forced together, the wires *x* being connected with a battery, heat is generated in the wire *e*, the battery being of such power that the electric current passing through the wire shall heat it hot enough to burn or char the surface of a stamp upon which the canceler is pressed The wires connecting with the battery do not interfere in the least with the free movement necessary in manipulating the canceler, and it will be readily seen that with its use postage-stamps can be not only more perfectly and readily marked than by the printing and marking cancelers now in use, but that an ineffaceable mark can be produced upon the stamp, which effectually cancels it.

The wire may be heated by a current generated by frictional or other electricity.

Having thus fully described my invention, what is claimed is—

1. In a canceling-stamp, the combination, with a canceling-die, of electric conductors for heating the die, substantially as set forth.

2. In a stamp-canceler, the combination of a body or handle, electric conductors, and a non-conducting carrier to which is attached a platinum or other die, as set forth.

3. In a stamp-canceler, the combination of a body or handle, A, electric conductors *x*, and a non-conducting spring-carrier, B, provided with a platinum or other die, whereby, upon striking the die upon a stamp, an electric current is generated which brands or burns the stamp, as set forth.

Witness my hand this 8th day of May, 1878, at Dayton, Ohio.

GRAHAM B. DENNIS.

In presence of—
PATRICK H. GUNCKEL,
CHAS. M. PECK.